No. 669,335. Patented Mar. 5, 1901.
O. F. BEHREND.
APPARATUS FOR PURIFYING WATER.
(Application filed July 24, 1900.)
(No Model.)
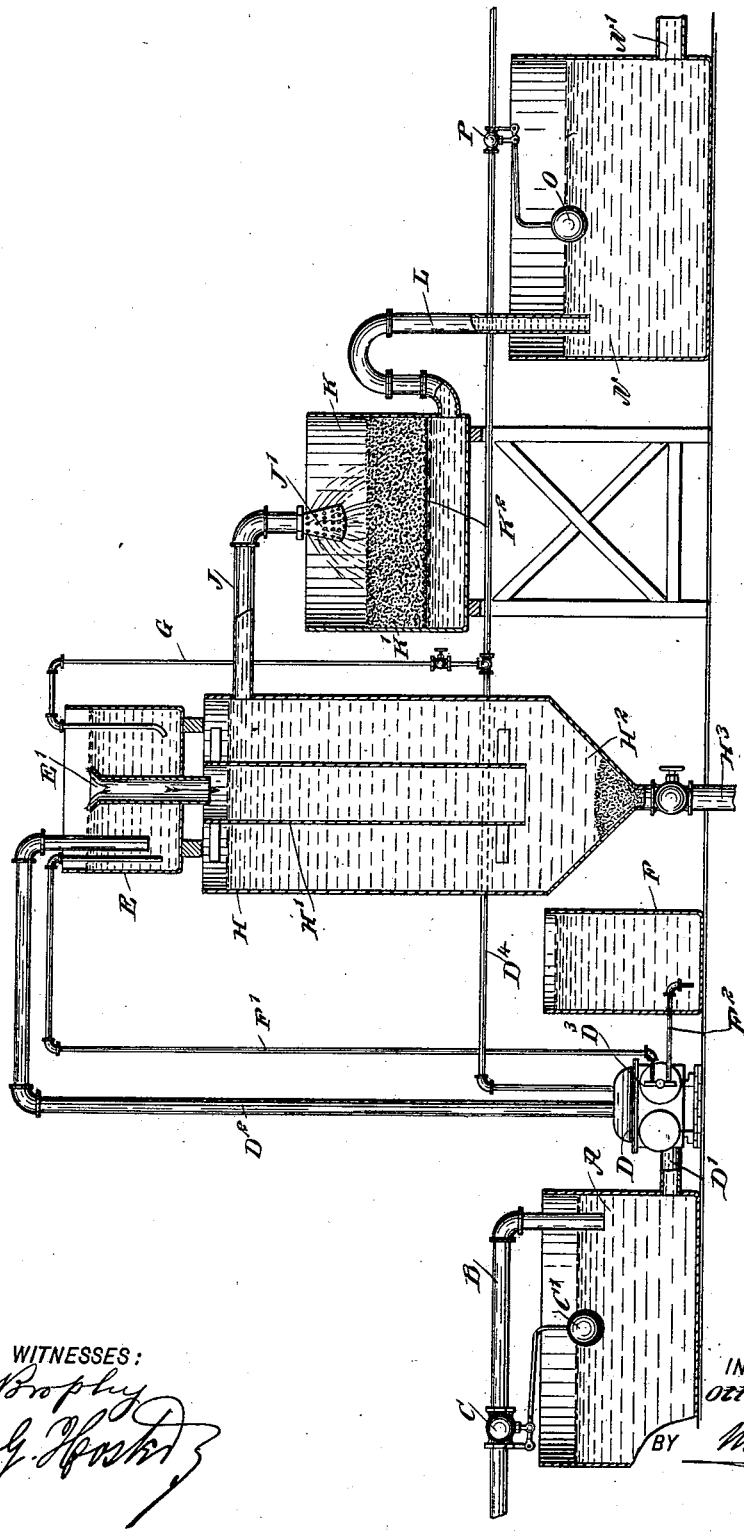
WITNESSES:
INVENTOR
Otto F. Behrend.
BY
ATTORNEYS

UNITED STATES PATENT OFFICE.

OTTO F. BEHREND, OF ERIE, PENNSYLVANIA.

APPARATUS FOR PURIFYING WATER.

SPECIFICATION forming part of Letters Patent No. 669,335, dated March 5, 1901.

Application filed July 24, 1900. Serial No. 24,633. (No model.)

*To all whom it may concern:*

Be it known that I, OTTO F. BEHREND, a citizen of the United States, and a resident of Erie, in the county of Erie and State of Pennsylvania, have invented a new and Improved Apparatus for Purifying Water, of which the following is a full, clear, and exact description.

The object of the invention is to provide a new and improved apparatus for purifying water, being especially adapted for purifying the feed-water of boilers to free the same from any salts of lime, magnesia, or other material having a tendency to produce scale in the boiler.

The invention consists of novel features and parts and combinations of the same, as will be fully described hereinafter and then pointed out in the claims.

Reference is to be had to the accompanying drawing, forming a part of this specification, in which the figure is a sectional side elevation of the improvement.

The improved apparatus shown in the drawing is provided with a receiving-tank A, into which impure water is discharged through a pipe B, having a valve C, controlled by a float C', rising and falling with the water as the latter passes into or out of the tank A. The tank A is connected with a suction-pipe D' of a steam-actuated water-pump D of any approved construction, and the water is forced by said pump through a discharge-pipe D² into a mixing-tank E, into which also discharges the discharge-pipe F' of an auxiliary pump D³, operating in conjunction with the pump D and having its suction-pipe F² leading into a solution-tank F, adapted to contain chemicals in solution tending to precipitate the impure matter in the impure feed-water, as hereinafter more fully described.

The solution and the impure water are separately pumped into the mixing-tank E, in which the solution and the impure water are agitated and thoroughly mixed by the action of a jet of steam issuing through a pipe G, leading from the steam-supply pipe D⁴ of the main pump D. In the tank E is arranged an overflow-pipe E', discharging into the upper open end of a pipe H', suspended within a precipitating-tank H, having a hopper-shaped bottom H², with a valved outlet H³ for discharging the precipitate from time to time by opening the valve in said pipe H³. The lower end of the pipe H' above mentioned terminates a short distance above the hopper H².

It is understood that as the mixture of impure water and chemical solution overflows into the upper end of the pipe H' this water flows down the pipe H' and passes from the lower end thereof into the tank proper, H, to then rise therein. The velocity of the mixture of impure water and chemical solution decreases during its downward passage in the pipe H', so that the chemicals precipitate the impure matter in the water and the precipitate settles and accumulates in the hopper H², from which it is discharged from time to time by opening the valve in the pipe H³, as above mentioned.

From the upper end of the precipitating-tank H leads a pipe J, having a sprinkler J' at its discharge end for minutely dividing the overflow-water from the tank H over a filter-bed K', contained in a filtering-tank K, said filter-bed K' being, preferably, of sand, gravel, or other filtering material held on a screen K², located a suitable distance above the bottom of the tank K. By the arrangement described a water-space is formed between the screen-bottom K² and the bottom of the filtering-tank, and this water-space is connected by a siphon-pipe L with the pure-water-storage tank N, having an outlet-pipe N', connected with a feed-water pump-ejector or like device for forcing pure feed-water into the boiler.

In the pure-water storage-tank is arranged a float O, controlling a valve P in the steam-supply pipe D⁴ for the pump D, so that when the tank N is nearly filled the float O closes the valve P, so as to shut off the steam-supply to the main pump D and stop the latter and at the same time shut off the steam-supply to the pipe G, used for directing steam into the liquid contained in the mixing-tank E, as above explained.

When the apparatus is in use, the water from the receiving-tank A and the chemical solution from the tank F are simultaneously pumped into the mixing-tank E, in which the impure water and the solution are thoroughly mixed or agitated, and the mixture overflows by the pipe E' into the pipe H' and travels downward therein to rise within the tank H for the purpose previously mentioned—that is, for precipitating the impure matter and for heating the feed-water as the same rises in said tank H. The overflow-water from the tank H is then subjected to a filtering process in the tank K, and then the pure water is stored in the tank N, having the controlling-float O for the pipes D⁴ and G.

From the foregoing it is evident that the purifying of the water takes place continuously—that is, as long as the pumps D D³ are kept going.

Having thus fully described my invention, I claim as new and desire to secure by Letters Patent—

1. An apparatus for purifying water, comprising an impure-water-receiving tank, a chemical-solution tank, a mixing-tank, steam-pumps for delivering the impure water and chemical solution to the mixing-tank, a steam-pipe entering the mixing-tank for delivering steam thereto to mix the impure water and chemical solution and heat the same, a precipitating-tank below the mixing-tank and provided with a central open-ended pipe through which the mixture of water and chemical solution passes from the mixing-tank to the precipitating-tank, a pipe leading from the upper end of the precipitating-tank and provided with a sprinkler at its discharge end, a filtering-tank having a filtering-bed upon which the sprinkler of the said pipe discharges, a storage-tank receiving the filtered water from the filtering-tank, a float in the storage-tank, and a valve operated by the float and controlling the supply of steam to the pumps and to the mixing-tank, substantially as described.

2. An apparatus for purifying water, comprising an impure-water-receiving tank, a chemical-solution tank, a mixing-tank having an overflow-pipe leading out through its bottom, pumps for delivering the impure water and chemical solution to the mixing-tank, a steam-pipe entering the mixing-tank for delivering steam therein to mix the impure water and chemical solution and heat the same, a precipitating-tank below the mixing-tank and provided with a central open-ended pipe into which the overflow-pipe of the mixing-tank discharges, said tank having a hopper-shaped bottom with a valved outlet, a pipe leading from the upper end of the precipitating-tank and provided with a sprinkler at its discharge end, and a filtering-tank having a filtering-bed upon which the sprinkler of the said pipe discharges and with an outlet-pipe below the filtering-bed, substantially as described.

3. In an apparatus for purifying water, the combination with a mixing-tank, steam-pumps for delivering impure water and a chemical solution to the mixing-tank, a precipitating-tank below the mixing-tank, and a filtering-tank into which the water from the precipitating-tank is discharged, of a storage-tank, a steam-pipe above the tank and connected with the pumps, a branch pipe leading from the main pipe to the mixing-tank, a valve in the main steam-pipe, and a float in the storage-tank and connected with the said valve, whereby the supply of steam to the pumps and mixing-tank will be automatically regulated, as set forth.

In testimony whereof I have signed my name to this specification in the presence of two subscribing witnesses.

OTTO F. BEHREND.

Witnesses:
ERNST R. BEHREND,
BERNHARD A. BEHREND.